United States Patent [19]

Vogel et al.

[11] 4,428,614

[45] Jan. 31, 1984

[54] VEHICLE ROOF WITH A ROOF OPENING CLOSABLE BY A COVER

[75] Inventors: Wolfgang Vogel, Stockdorf-Gauting; Alfons Lutz, Emmering; Richard Igel, Germering; August Hirschberger, Munich, all of Fed. Rep. of Germany

[73] Assignee: Webasto-Werk W. Baier GmbH and Co., Munich, Fed. Rep. of Germany

[21] Appl. No.: 170,184

[22] Filed: Jul. 18, 1980

[30] Foreign Application Priority Data

Jul. 18, 1979 [DE] Fed. Rep. of Germany ....... 2928994

[51] Int. Cl.³ .................................................. B60J 7/08
[52] U.S. Cl. ...................................... 296/224; 296/218
[58] Field of Search ................ 292/277, 278; 296/216, 296/217, 218, 221, 224

[56] References Cited

U.S. PATENT DOCUMENTS

| 4,131,970 | 1/1979 | Le Van | 296/224 |
| 4,142,761 | 3/1979 | Lutz, et al. | 296/137 B |
| 4,219,231 | 8/1980 | Igel | 296/218 |
| 4,226,052 | 10/1980 | DeStepheno | 296/218 |

FOREIGN PATENT DOCUMENTS 2710193  4/1979  Fed. Rep. of Germany ...... 296/224

Primary Examiner—Richard A. Bertsch
Attorney, Agent, or Firm—Antonelli, Terry & Wands

[57] ABSTRACT

A vehicle roof with a roof opening and a removable cover for closing the opening of the type wherein the cover is attachable to a roof frame in the vicinity of its forward edge by means of a releasable swivel connection about an axis running at right angles to a lengthwise axis of the vehicle roof and having a rear edge pivotable out of the roof plane, upward and outward, by means of a tilting device that is releasable from the cover is improved by the provision of a safety device for releasing the tilting device from the cover only when the cover is in its closed position. In accordance with a preferred embodiment the safety device includes an unlocking element for releasing the tilting device from the cover which is constructed in the range so as only to be accessible when the cover is closed. In the closed position the unlocking element can be operated by means of a coin or like object so as to be shifted from an engaged or disengaged position.

14 Claims, 7 Drawing Figures

1

VEHICLE ROOF WITH A ROOF OPENING CLOSABLE BY A COVER

BACKGROUND AND SUMMARY OF THE INVENTION

The invention relates to a vehicle roof with a roof opening, said opening being closable by a removable cover that is attached to a roof frame in the vicinity of its forward edge by means of a releasable swivel connection around an axis running at right angles to the lengthwise axis of the vehicle. The swivelable connection enabling the cover to move upwardly and outward so that its rear edge projects above the roof plane in conjunction with a tilting device that is located between the roof frame and the cover and releasable from the cover.

In known vehicle roofs of this type (German Auslegeschrift No. 2,710,193) and corresponding to U.S. Pat. No. 4,126,761, a telescopic screw with a threaded part is provided as a tilting device, said threaded part comprising two laterally projecting locking pins, said pins being engageable with safety catches, said catches being located on the underside of the cover and releasable against spring force, while an additional threaded part of the telescopic screw is connected with the roof frame. By actuating the safety latches, the locking pins are released, whereupon the cover may be removed. An arrangement of this sort permits the cover to be tilted for ventilation or even removed completely if desired. However, if the locking pins are released with the cover fully or partially tilted, it can easily happen that one forgets to retract the telescopic screw after the cover is removed. The telescopic screw then projects with its upper part out of the vehicle roof, forming a source of danger.

Thus, an object of the present invention is to avoid this disadvantage and to improve vehicle roofs of this type with regard to accident safety.

This object is achieved according to a preferred embodiment of the invention by virtue of the fact that a safety device is provided which permits the tilting device to be separated from the cover only when the cover is closed. By this means, it is ensured that the user can separate the tilting device from the cover only when the tilting device is retracted. When the cover is removed, consequently, the tilting device will always be in the position which corresponds to the closed position of the cover.

The safety device advantageously comprises an unlocking element which serves to release the tilting device from the cover, said element being accessible only when the cover is closed. In this fashion, improper release of the tilting device is easily avoided.

A solution which is especially advantageous from a design standpoint is one in which the unlocking element is positively connected with a matching part mounted on the cover, and participates in the tilting movement of the cover as long as the tilting device is connected with the cover. In particular, a pin rotatably mounted in the tilting device is suitable as an unlocking element, said pin tapering conically in the vicinity of its upper end and being provided with shoulders on opposite sides, beneath which shoulders a locking spring may be introduced, said spring being mounted on the matching part and being spreadable by turning the pin to release the cover.

Protection against releasing the tilting device from the cover when the cover is tilted can be provided in simple fashion by having the pin, when the cover is closed, have its lower end project out of a handle for actuating the tilting device, and having a slot at its lower end, permitting the pin to be rotated by means of a coin or the like.

In order to ensure that the cover and tilting device are reliably connected when the cover is replaced, the pin which constitutes the unlocking element is advantageously rotatable into the position in which the locking spring is located beneath the shoulders of the pin, when the cover is pressed against the tilting device by forcing it against the locking spring.

Advantageously, a bridge pivotably mounted on the cover is provided as the matching part. The tilting device is advantageously formed by a telescopic screw which consists of a threaded element rotatably mounted on the fixed part of the roof, an element with opposite threads which supports the unlocking element and is releasably connectable with the cover, and an intermediate threaded element which is located between these two elements.

In another embodiment of the invention, the safety device is under tension which acts in an opening direction when the cover is closed. This ensures that the cover pops up as soon as the tilting device is separated from the cover. To produce such pretensioning, a seal located between the cover and the fixed part of the roof can be used advantageously.

However, to prevent the cover flying off while the vehicle is in motion as a result of improper operation, it is advantageous to provide a safety hook arrangement which is releasable only from outside when the cover is raised, said safety hook arrangement forming a connection between the cover and the fixed part of the roof in the engaged position. The safety hook arrangement can advantageously comprise one, first safety hook mounted on the cover and pivotable against spring force, and a second safety hook which cooperates with the first and is articulated to the tilting device.

These and further objects, features and advantages of the present invention will become more obvious from the following description when taken in connection with the accompanying drawings which show, for purposes of illustration only several embodiments in accordance with the present invention.

DETAILED DESCRIPTION OF THE PREFERRED EMBODIMENT

Figure 1:
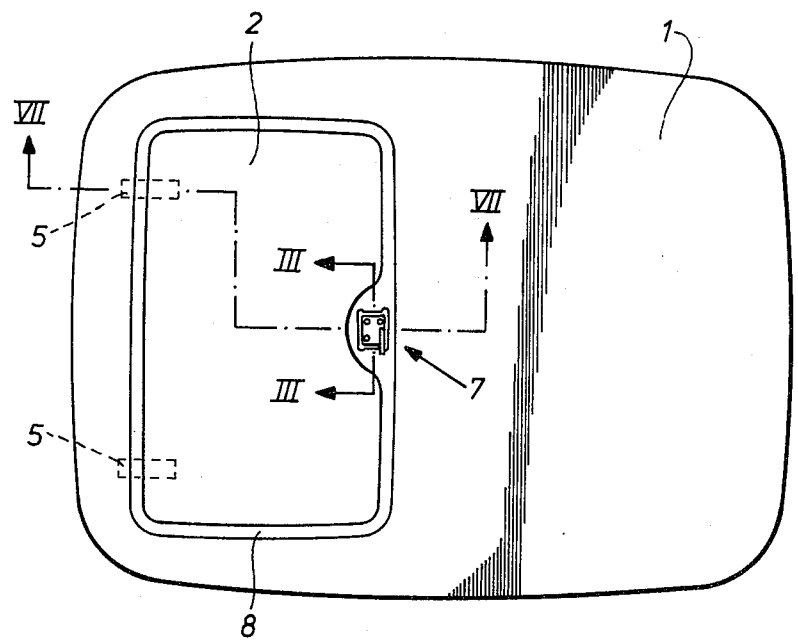
FIG. 1 is a top view of the vehicle roof with the cover removed.
Figure 2:
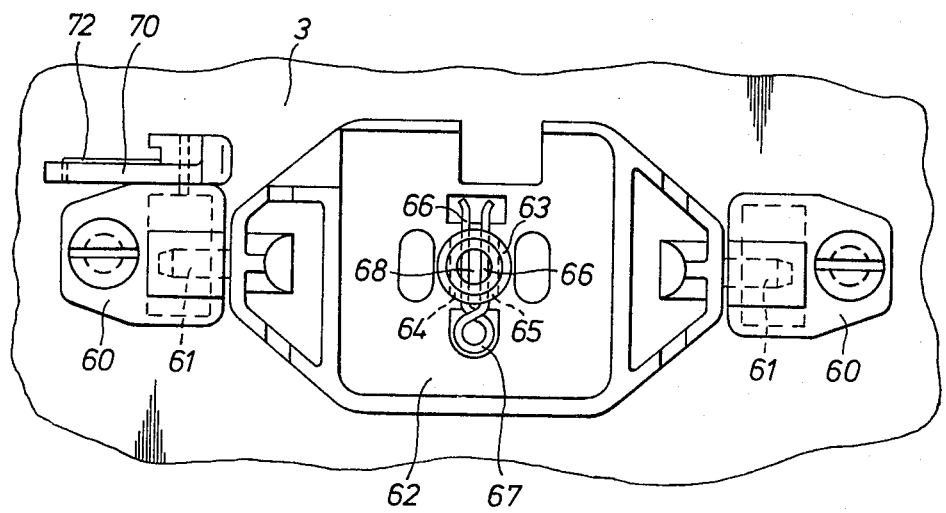
FIG. 2 is a partial view of the cover corresponding to lines II—II in FIG. 7 on an enlarged scale.

In FIG. 1, the roof 1 of a motor vehicle, especially an automobile, is shown. The roof 1 has a roof opening 2 that is closable by a cover 3. Cover 3 is provided at its front edge 4 (FIG. 7) with projecting elements 5 (which are also shown schematically in FIG. 1 in dashed lines), said elements forming a releasable pivoting connection in a manner to be described hereinbelow. Cover 3 is connected in the vicinity of its rear edge 6 with roof 1 by means of a tilting device 7 which is releasable from the cover.

Figure 7:
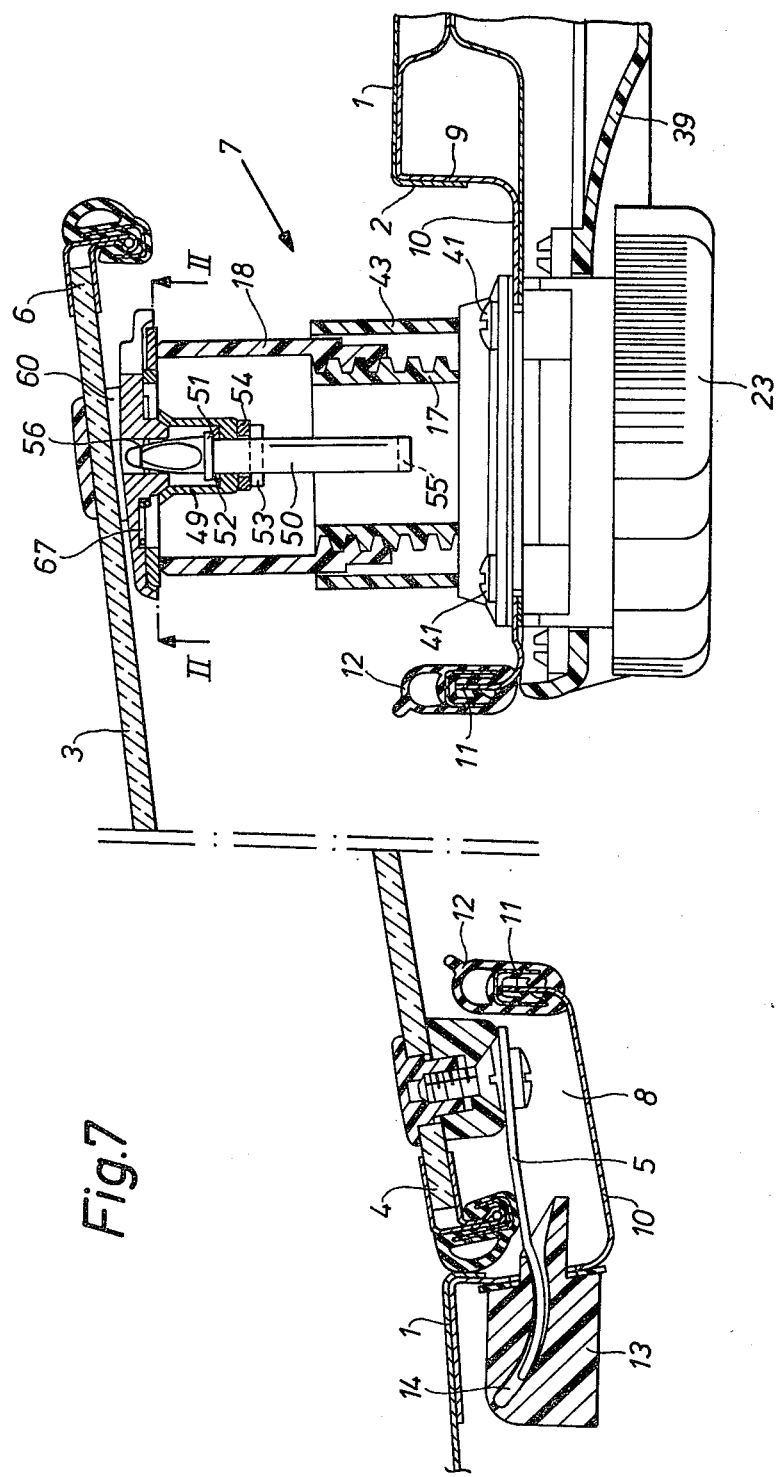
FIG. 7 is a partial section along line VII—VII in FIG. 1, as unlocking pin being shown in elevation.

As can be seen from FIG. 7, roof opening 2 is surrounded by a rain gutter 8, said gutter being formed by a frame part 9 extending downward from roof 1 and a bottom part 10 with upwardly bent edge 11. An elastic seal 12, running around roof opening 2, is pushed on to edge 11. Two recess parts 13 having slots 14 are provided in the front frame part 9, the length of said slots roughly corresponding to the width of element 5. Elements 5, as shown in FIG. 7, are inserted in slots 14 of recess parts 13 and form a releasable pivoting connection between roof 1 and cover 3.

Figure 3:
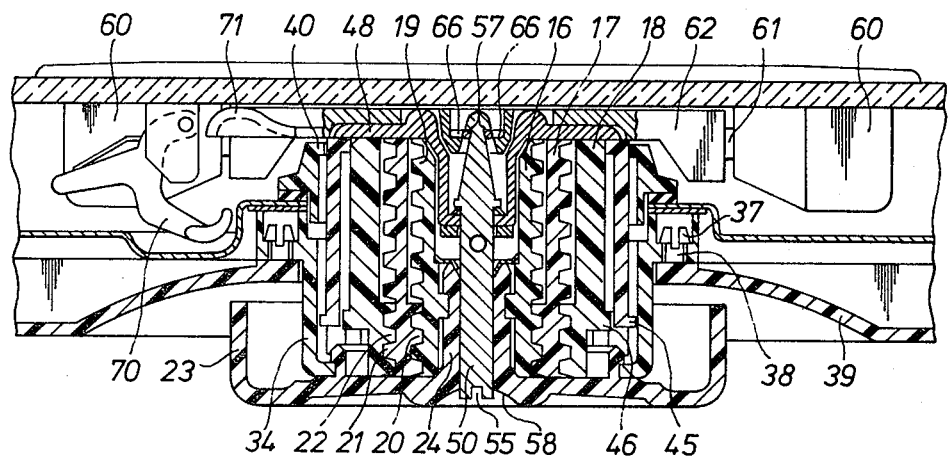
FIG. 3 is a section along line III—III in FIG. 1, with the cover closed.

Tilting device 7 comprises a telescopic screw, comprised of a sleeve-shaped threaded element 16, an intermediate threaded element 17, and an oppositely threaded element 18 (FIG. 3). Threaded element 16 has an external thread 19, meshing with an internal thread 20 of intermediate threaded element 17. Intermediate threaded element 17 also has an external thread 21, which meshes with an internal thread 22 of oppositely threaded element 18. A handle 23 has a hub 24 which is provided with axially extending slots by which rotation of the handle 23 is transmitted to threaded element 16's teeth 25 which mesh therewith. A projection 26 of threaded element 16, which projects inward, fits into a corresponding annular groove 27 on hub 24, in order to ensure a mutual connection of handle 23 and threaded element 16 against relative axial shifting. Hub 24 further comprises a central bore 28, which expands conically at its upper end. A spring washer 30 has an outer edge which abuts the inner wall of the sleeve-shaped threaded element 16 and overlaps the upper end of hub 24 with its inside edge in such fashion that the hub parts are spread outward.

Figure 6:
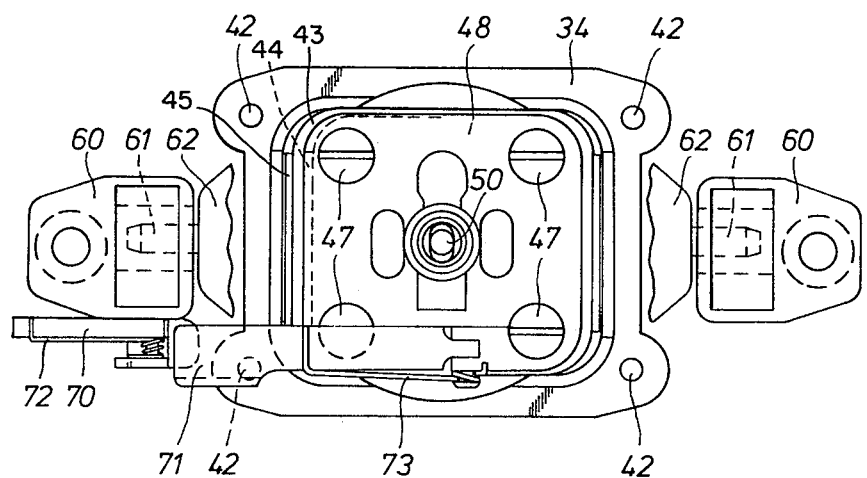
FIG. 6 is a top view of the tilting device, with the cover and the covering removed.

A rib 31 on handle 23, which is concentric with respect to hub 24, has an annular groove 32 on its outer side, into which an annular projection 33 of a housing part 34 fits with play. Housing part 34 comprises a plurality, for example four, of recesses 35, distributed around the circumference, with shoulders 36, against which the expanded heads 37 of slotted connecting elements 39 abut, said elements in turn being connected integrally with a handle recess forming part 39. A sleeve cover 40 is installed on the upper side of bottom part 10. Screws 41, FIG. 7, engage bores 42, FIG. 6, of housing part 34 and penetrate through bores in bottom parts 10, so as to connect housing part 34 and sleeve cover 40 with the fixed part of the roof.

Figure 4:
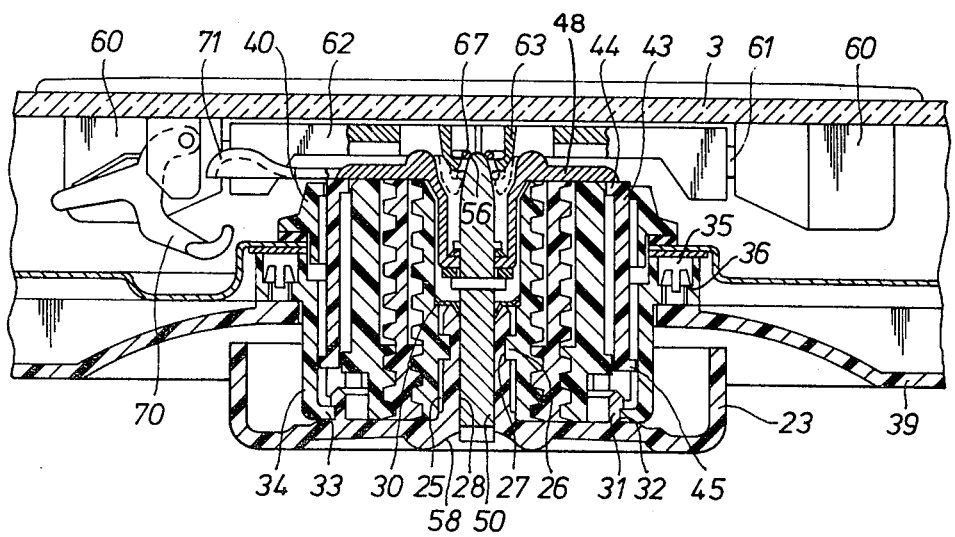
FIG. 4 is a section similar to FIG. 3, but with the tilting device separated from the cover.

A sleeve 43, of rectangular cross section, is guided in a space which is delimited by housing part 34, sleeve cover 40, and opposite threaded element 18. Sleeve 43, in the vicinity of its upper end and on opposite sides, has two inwardly projecting ribs 44, while in the vicinity of the lower sleeve end, two flange parts 45 project outward. Sleeve 43 is displaceable between the retracted position shown in FIG. 4 and a position (FIG. 7) in which the flange parts 45 abut sleeve cover 40, while opposite threaded element 18, which is prevented from making a rotational movement by its engagement with sleeve 43, is movable upward, until outwardly projecting ribs 46 of opposite threaded element 18 strike ribs 44 of sleeve 43.

A plate 48 is screwed to opposite threaded element 18 with screws 47 (FIG. 6), said plate comprising a hub 49 which projects down into the inner space of threaded element 16. A pin 50 is rotatably mounted in hub 49. Pin 50 has a rim 51 which abuts a spring washer 52 located in hub 49. Rim 51 is maintained in engagement with spring washer 52 by a locking pin 53 and a washer 54, which abuts the lower end of hub 49. Pin 50 is provided with a slot 55 at its lower end. The edge of a coin or the like can be introduced into this slot. Pin 50 is tapered conically in the vicinity of its upper end 56 and is provided on opposite sides with two shoulders 57. The length of pin 50 is made such that when cover 3 is in the closed position, the slotted lower bolt end projects from hub 24 into a depression 58 in handle 23, and therefore is accessible for actuation by a coin or the like.

Cover 3 in the vicinity of its rear edge 6, has two bearing blocks 60, into each of which one bearing pin 61 is inserted. Bearing pins 61 extend into bores in a bridge 62, in order thereby to hold bridge 62 in such a way that it is pivotable on the cover about an axis which is perpendicular to the lengthwise direction of the vehicle. The bridge 62 is provided in its central part with a downward projection 63, formed with two channels 64 and 65 which run in the direction of the length of the vehicle. Legs 66 of a locking spring 67 extend through channels 64 and 65. Legs 66 are free in the vicinity of a central recess 68 in projection 63, and can move laterally within limits in the direction of the axis formed by bearing pins 61.

Normally, legs 66 of locking spring 67 rest in the manner shown in FIG. 3 beneath shoulders 57 of pin 50, in order in this fashion to connect tilting device 7 with cover 3. If, when the cover is closed, pin 50 is rotated by means of a coin or the like through 90° into the position shown in FIG. 4, locking spring 67 is spread; legs 66 are then released from shoulders 57. Because the elastic seal 12 keeps cover 3 slightly pretensioned, cover 3 moves upward in the vicinity of its rear edge 6, whereby projection 63 and locking spring 67 snaps from the position shown by the solid lines. Tilting device 7 is now separated from cover 3.

However, in order to prevent cover 3 from flying off as the result of improper operation, especially if pin 50 is rotated with the vehicle in motion, safety hooks 70 and 71 are provided, one of which is connected with plate 48 and the other is articulated with one of the two bearing blocks 60. Return springs 72 and 73 normally keep safety hooks 70 and 71 engage one another when cover 3 has reached the pivot position shown in FIG. 5.

Figure 5:
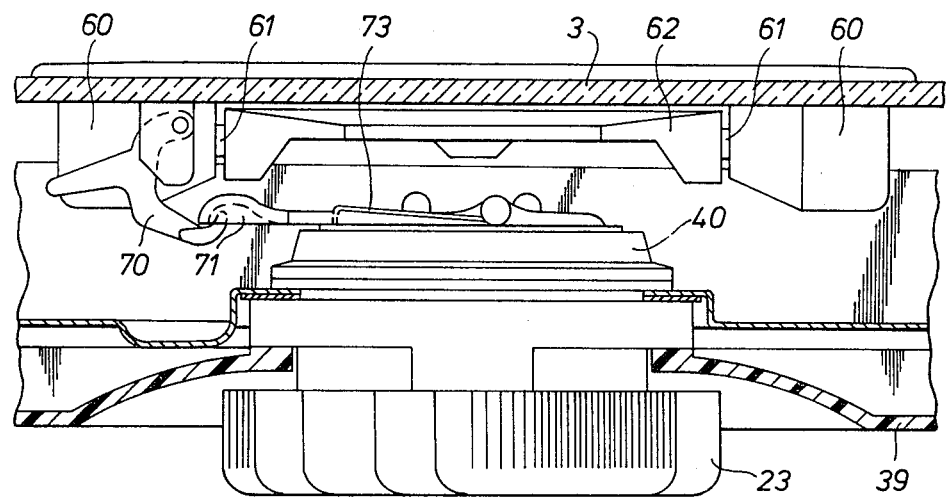
FIG. 5 is a partial cross section similar to FIGS. 3 and 4 with the cover tilted.

In order to remove the cover, the latter is raised to the position shown in FIG. 5. Then one of the safety hooks 70 or 71 is pivoted from outside until the safety hooks release the cover. Now the cover can be pivoted further outward and then pulled out of recesses 13.

When replacing cover 3, the cover is pressed against tilting device 7. Locking spring 67 then presses against the end 56 of bolt 50 and turns bolt 50 automatically into the angular position shown in FIG. 3, wherein legs 66 are aligned with shoulders 57. By pushing the cover further down, legs 66 snap under shoulders 57 and safety hooks 70 and 71 are again in the engaged position. The connection between cover 3 and tilting device 7 has thus been effected. If cover 3 is to be tilted by rotating handle 23 (FIG. 7), pin 50 together with the cover travels upward. Slot 55 therefore disappears into hub 24 so that the tilting device 7 cannot be released from the cover. When cover 3 is returned from the fully tilted position shown in FIG. 7 in the direction of the closed position, spring washer 30 forms a funnel-shaped guide which steers the lower end of pin 50 into the hub 24 of handle 23.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Vehicle roof with a roof opening and removable cover for closing said opening, said cover being attachable to a roof frame in the vicinity of its forward edge by means of a releasable swivel connection about an axis running at right angles to a lengthwise axis of the vehicle roof, and said cover having its rear edge pivotable out of the roof plane upward and outward, by means of a tilting device disposed between the roof frame and the cover and releasable from the cover, characterized by the provision of a safety device for releasing the tilting device from the cover only when the cover is closed.

2. Vehicle roof according to claim 1, characterized by the fact that the safety device comprises an unlocking element for releasing the tilting device from said cover, said unlocking element being constructed and arranged so as to be accessible only when the cover is closed.

3. Vehicle roof according to claim 2, wherein said safety device further comprises a matching element mounted on said cover for positively connecting with said unlocking element when said tilting device is connected to said cover and participating in the tilting movement of the cover.

4. Vehicle roof according to claim 3, wherein said unlocking element comprises a pin rotatably mounted in the tilting device, said pin tapering conically in the vicinity of its upper end and being provided on opposite sides with shoulders and wherein said matching element is provided with a spring that is engageable beneath said shoulders of the unlocking element, said spring being constructed and arranged so as to be spreadable by rotating the pin to release said cover.

5. Vehicle roof according to claim 4, wherein said tilting device has an actuating handle, said pin, when the cover is closed, having a lower end projecting from said handle and having a slot on said lower end for enabling rotation of said pin, by means of a coin or the like, from an engaged position wherein said engaging of the spring and shoulder is achieved to a disengaged position wherein said spring is disengaged from said pin.

6. Vehicle roof according to claim 4 or 5, wherein said spring and pin are constructed and arranged for causing pressing of said cover against said tilting device to automatically rotate said pin and engage said locking spring beneath the shoulders of the pin.

7. Vehicle roof according to one of claims 3 or 4, wherein said matching element comprises a pivotably mounted bridge provided on said cover.

8. Vehicle roof according to one of claims 2 or 4, wherein the tilting device is formed by a telescopic screw, said screw comprising a threaded element rotatably mounted on a fixed roof part, an oppositely threaded element supporting the unlocking element and releasably connectable with the cover, and an intermediate threaded element, located between the threaded and oppositely threaded elements.

9. Vehicle roof according to claim 2 or 4, comprising pretensioning means for biasing said cover away from said roof opening when said cover is closed.

10. Vehicle roof according to claim 9, wherein said pretensioning means comprises a seal, located between the cover and a fixed roof part.

11. Vehicle roof according to claims 2 or 4, comprising a safety hook arrangement which is releasable only from outside when the cover is raised, said arrangement forming a connection between the cover and a fixed roof part when engaged.

12. Vehicle roof according to claim 11, wherein the safety hook arrangement comprises a first safety hook mounted on the cover and pivotable against spring force, and a second safety hook cooperating with the first safety hook and articulated to the tilting device.

13. Vehicle roof according to claim 9, comprising a safety hook arrangement which is releasable only from outside when the cover is raised, said arrangement forming a connection between the cover and a fixed roof part when engaged.

14. Vehicle roof according to claim 13, wherein the safety hook arrangement comprises a first safety hook mounted on the cover and pivotable against spring force, and a second safety hook cooperating with the first safety hook and articulated to the tilting device.

* * * * *